US009723955B2

(12) United States Patent
Booker

(10) Patent No.: US 9,723,955 B2
(45) Date of Patent: Aug. 8, 2017

(54) COOKWARE WITH BUILT-IN DRAINS

(71) Applicant: Shondelle Booker, Nashville, TN (US)

(72) Inventor: Shondelle Booker, Nashville, TN (US)

( * ) Notice: Subject to any disclaimer, the term of this patent is extended or adjusted under 35 U.S.C. 154(b) by 0 days.

(21) Appl. No.: 14/701,780

(22) Filed: May 1, 2015

(65) Prior Publication Data

US 2015/0313410 A1 Nov. 5, 2015

Related U.S. Application Data

(60) Provisional application No. 61/987,388, filed on May 1, 2014.

(51) Int. Cl.
*A47J 37/12* (2006.01)
*A47J 27/00* (2006.01)
*A47J 37/10* (2006.01)

(52) U.S. Cl.
CPC ............. *A47J 37/108* (2013.01); *A47J 37/10* (2013.01)

(58) Field of Classification Search
CPC ................................ A47J 37/10; A47J 37/108
USPC ............................ 99/330, 410, 415, 444, 446
See application file for complete search history.

(56) References Cited

U.S. PATENT DOCUMENTS

| 2,614,482 | A | | 10/1952 | Lonskey | |
|---|---|---|---|---|---|
| 3,187,664 | A | | 6/1965 | Jennings | |
| 5,467,696 | A | * | 11/1995 | Everhart | A47J 37/10 99/375 |
| 5,967,024 | A | | 10/1999 | DeMars | |
| 8,246,824 | B2 | | 8/2012 | Larin | |
| 8,309,151 | B2 | | 11/2012 | Popeil | |
| 2005/0279698 | A1 | * | 12/2005 | Kleinman | A47J 45/061 210/470 |
| 2009/0087534 | A1 | * | 4/2009 | McLemore | A47J 37/1209 426/523 |
| 2009/0158940 | A1 | * | 6/2009 | Archer | A47J 39/006 99/403 |
| 2009/0277338 | A1 | | 11/2009 | Palmer | |
| 2011/0185916 | A1 | * | 8/2011 | Penny | A47J 37/07 99/340 |
| 2012/0167778 | A1 | * | 7/2012 | Popeil | A47J 37/1219 99/339 |
| 2013/0139705 | A1 | * | 6/2013 | Battaglia | A47J 36/08 99/355 |

\* cited by examiner

*Primary Examiner* — Dana Ross
*Assistant Examiner* — Lindsey C Staubach

(57) ABSTRACT

Cookware with built-in drains allows liquid to drain out without tipping the pan. The drain is structured so as not to leak or interfere with the cookware's thermal properties. Each pan provides a close fitting strainer which fits snugly within the pan. The strainer provides a plurality of apertures in its bottom surface which may be opened and closed by the user. One or more clamps may be used to lift the strainer and food out of the pan, and drain excess fluid into the pan by opening the apertures.

12 Claims, 2 Drawing Sheets

COOKWARE WITH BUILT-IN DRAINS

CROSS-REFERENCE TO RELATED APPLICATIONS

This Application claims the benefit of U.S. Provisional Application No. 61/987,388, filed May 1, 2014, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to cookware and accessories and in particular to cookware with built-in drains. When cooking, excess fluid frequently needs to be drained from food. Unfortunately, many people who cook for themselves and their families do not have the strength in their hands and forearms to drain excess fluid into the sink safely, particularly when cooking with larger pots and pans. When using a colander or similar device, some of the food invariably becomes stuck and creates one more dish that needs washing. Cookware with built-in drains, which provides a drain near the bottom of each pot or pan for the purpose of safely and easily draining off excess fluid, would resolve these problems.

SUMMARY OF THE INVENTION

Accordingly, the invention is directed to cookware with built-in drains. The drain in each pan may be opened to allow liquid to drain out without tipping the pan. The drain is structured so as not to leak or interfere with the cookware's thermal properties. Each pan provides a close fitting strainer which fits snugly within the pan. The strainer provides a plurality of pierced apertures in its bottom surface which may be opened and closed by the user. One or more clamps may be used to lift the strainer and food out of the pan, and drain excess fluid into the pan by opening the apertures.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrates one embodiment of the invention and, together with the description, serves to explain the principles of the invention.

DETAILED DESCRIPTION OF THE INVENTION

Figure 1:
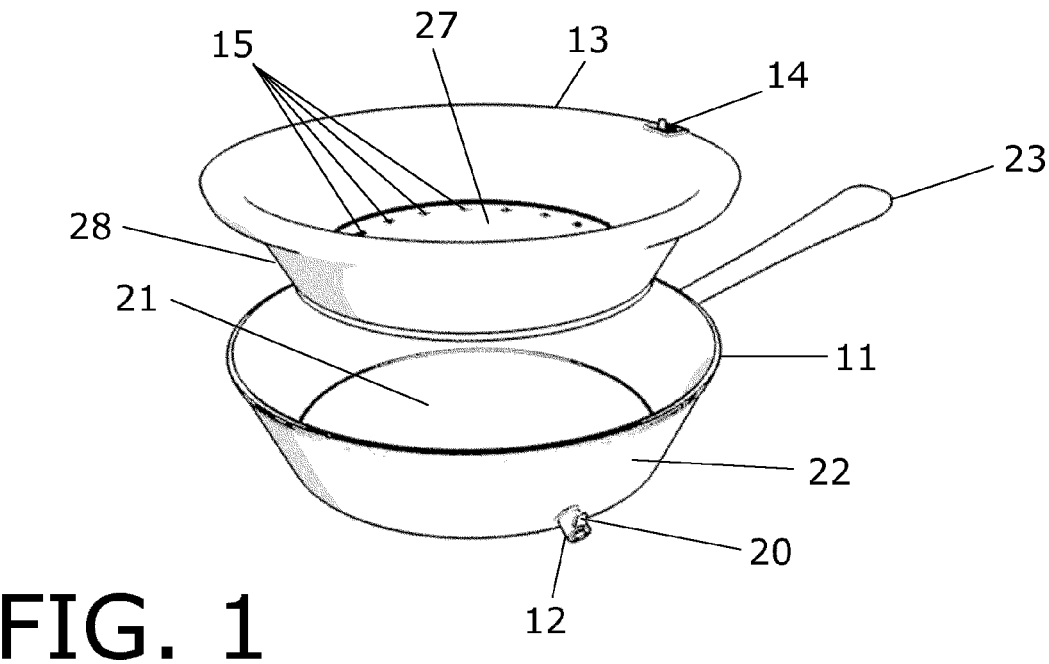
FIG. 1 is a top perspective view of the large skillet component of the first exemplary embodiment with the lid removed, displaying the large skillet 11, the drain 12, the strainer 13, the knob 14, the apertures 15, the valve 20, the skillet bottom surface 21, the skillet side surface 22, the skillet handle 23, the strainer bottom 27, and the strainer side 28.
Figure 2:
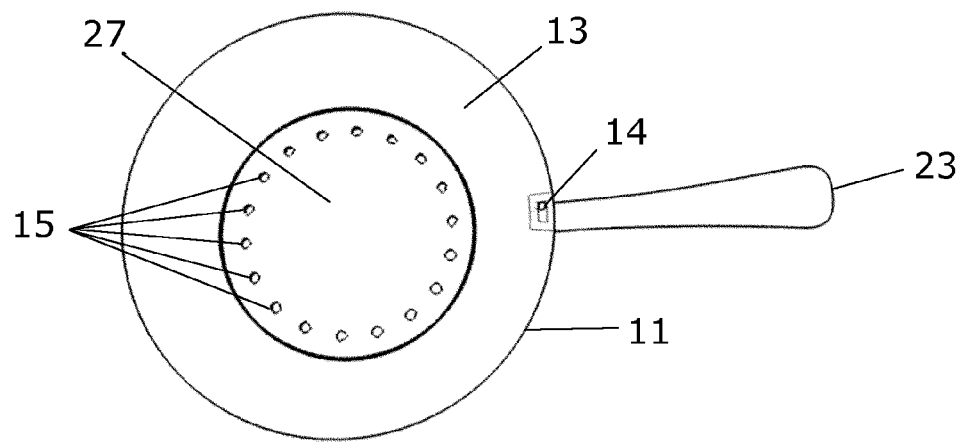
FIG. 2 is a top view of the large skillet component of the first exemplary embodiment with the lid removed, displaying the large skillet 11, the strainer 13, the knob 14, the apertures 15, the skillet handle 23, and the strainer bottom 27.
Figure 3:
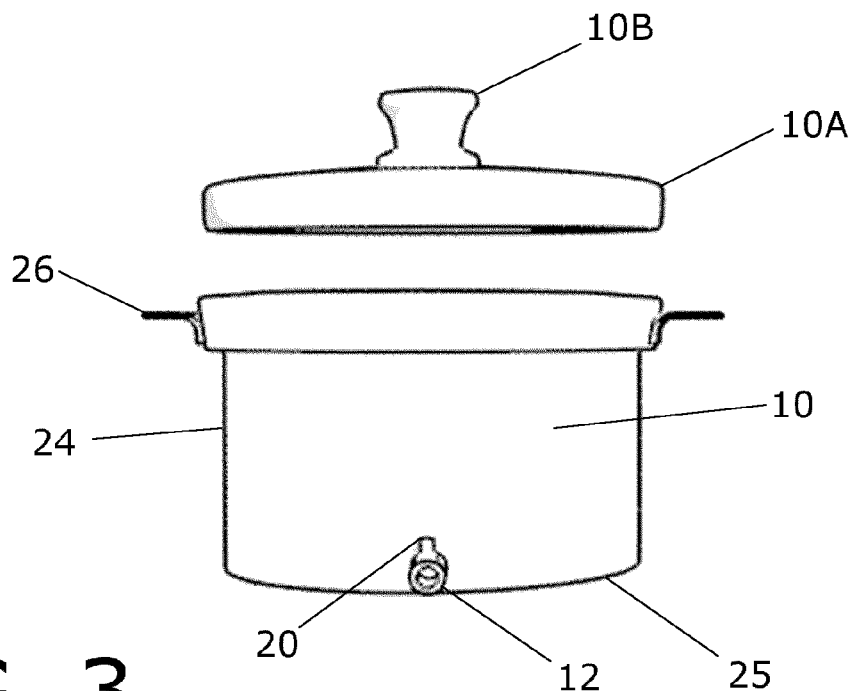
FIG. 3 is a side view of the large cooking pot component of the first exemplary embodiment, displaying the large cooking pot 10, the lid 10A, the lid handle 10B, the drain 12, the valve 20, the pot side surface 24, the pot side surface 25, and the pot handle 26.
Figure 4:
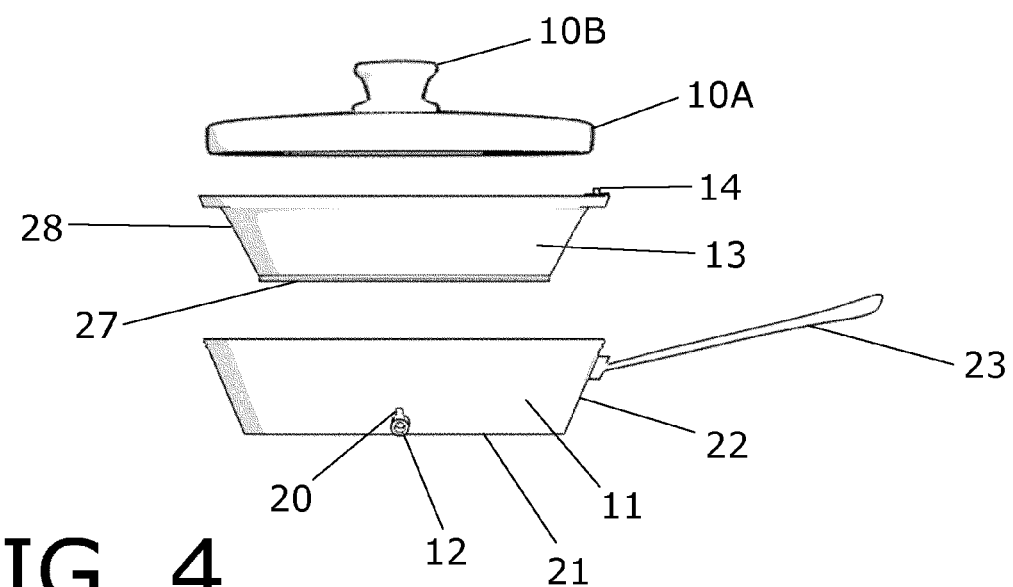
FIG. 4 is a side view of the large skillet component of the first exemplary embodiment, displaying the lid 10A, the lid handle 10B, the large skillet 11, the drain 12, the strainer 13, the knob 14, the valve 20, the skillet side surface 21, the skillet bottom surface 22, the skillet handle 23, the strainer bottom 27, and the strainer side 28.

Referring now to the invention in more detail, the invention is directed to cookware with built-in drains 12. The drain 12 in each pan may be opened to allow liquid to drain out without tipping the pan. The drain 12 is structured so as not to leak or interfere with the cookware's thermal properties and is opened by operating the valve 20. Each pan provides a close fitting strainer 13 which fits snugly within the pan. The strainer bottom 27 resting on the skillet bottom 21 and the strainer side 28 resting on the skillet side 22. The strainer 13 provides a plurality of pierced apertures 15 in its bottom surface which may be opened and closed by the user. One or more clamps 26 may be used to lift the strainer 13 and food out of the pan, and drain excess fluid into the pan by opening the apertures 15.

Components of the first exemplary embodiment preferably include five pans, provided as a set. The set comprises a large cooking pot 10, a large skillet 11, a small skillet, a large saucepan, a medium saucepan, and a small saucepan. More or fewer pans are contemplated and each pan may be provided separately. Each pan provides a close fitting lid 10A with a handle 10B at the center of the top surface. Preferably, the large cooking pot 10 and the large skillet 11 are the same diameter, such that they may use the same lid 10A. A drain 12 is provided in the skillet side surface 21, pot side surface 24, and saucepan side surfaces, close to the skillet bottom surface 22, pot bottom surface 25 and saucepan bottom surfaces respectively. The drain 12 is located at a 90° rotation around the pan from the handle 23 or handles of the pan. The drain 12 is preferably insulated, with an easy-grip surface, and a valve 20 may be easily closed and opened while wearing a cooking mitt.

Each pan also provides a close fitting strainer 13 with a bottom 27 and side 28. The strainer 13 fits snugly within its interior surface of the pan. The strainer 13 provides a knob 14 on its upper rim which may be used to open a plurality of apertures 15 on the bottom surface of the strainer 13. The apertures 15 are controlled by a rotating internal plate, with complimentary apertures of its own which line up with the apertures 15 of the strainer 13 when in the open position. The rotating internal plate is rotationally urged by the knob 14. The knob 14 is interlinked with the internal plate so that when the knob 14 is slide back and forth laterally the internal plate is rotated.

The knob 14 rotates the internal plate a few degrees, effectively closing the apertures 15. Like the drain 12, the knob 14 is preferably insulated, with an easy-grip surface, and may be easily closed and opened while wearing a cooking mitt. In the first exemplary embodiment, the knob 14 operates by sliding back and forth laterally. Alternate embodiments, providing a knob 14 which operates by turning or some other operation, are also contemplated.

The strainer 13 with food may be easily lifted out of the pan with one or more clamps, which are provided. Each clamp provides an insulated handle, and may be used to securely grip the rim of the strainer 13 and lift it out.

To use the first exemplary embodiment, the user inserts the strainer 13 into the pan, opens the apertures 15 by sliding the knob 14, and places food and fluid to be cooked together within the strainer 13. The user then cooks the food as desired, slides the knob 14 to the closed position, grips the rim of the strainer 13 with one or more clamps, and lifts out the strainer 13 and food, allowing it to drain into the pan. The user then pours the food out of the strainer 13 into a serving or mixing bowl as desired, carries the pan to the sink or other drainage fixture, opens the drain 11, and drains the liquid out of the pan.

The large cooking pot 10, the lids 10A, the large skillet 11, the strainers 13, the small skillet, the large saucepan, the medium saucepan, and the small saucepan are preferably manufactured from rigid, durable materials which are thermally uniform, easily cleaned, and dishwasher safe, such as stainless steel or aluminum alloy, with handles which are preferably manufactured from rigid, durable materials which provide an insulating quality, such as plastic, acrylic polymer, or wood. The drains 12 and the knobs 14 are preferably manufactured from insulating ceramics, with a core manufactured from stainless steel or aluminum alloy.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

What is claimed is:

1. A cookware with built in drain comprising:
   (a) a saucepan;
   (b) said saucepan having a bottom surface and a side surface;
   (c) a drain;
   (d) said drain being controlled by a valve attached to said side surface near said bottom surface;
   (e) a strainer;
   (f) said strainer having a strainer bottom and a strainer side;
   (g) said strainer being of a size and shape that conforms to and fits snuggly within said saucepan;
   (h) said strainer being pierced by a plurality of apertures along said bottom surface, and said plurality of apertures may be opened and closed by a rotating internal plate, said rotating internal plate being pierced by a plurality of complementary apertures of the same size and shape as said plurality of apertures in said strainer;
   (i) a lid;
   (j) said lid being of a size and shape that conforms to and fits snuggly on top of said saucepan and said strainer;
   (k) said lid having a handle; and
   (l) said handle being located at the center of a top surface of said lid.

2. The cookware with built in drain of claim 1 wherein said drain is insulated.

3. The cookware with built in drain of claim 1 wherein said internal plate is rotationally urged by a knob.

4. The cookware with built in drain of claim 3 wherein said knob is interlinked with said internal plate such that said knob rotates said internal plate by sliding back and forth laterally.

5. A cookware with built in drain comprising:
   (a) a pot;
   (b) said pot having a bottom surface and a side surface;
   (c) a drain;
   (d) said drain being controlled by a valve attached to said side surface near said bottom;
   (e) a strainer;
   (f) said strainer having a strainer bottom and a strainer side;
   (g) said strainer being of a size and shape that conforms to and fits snuggly within said pot;
   (h) said strainer being pierced by a plurality of apertures along said strainer bottom, and said plurality of apertures may be opened and closed by a rotating internal plate, said rotating internal plate being pierced by a plurality of complementary apertures of the same size and shape as said plurality of apertures in said strainer;
   (i) a lid;
   (j) said lid being of a size and shape that conforms to and fits snuggly on top of said pot and said strainer;
   (k) said lid having a handle; and
   (l) said handle being located at the center of a top surface of said lid.

6. The cookware with built in drain of claim 5 wherein said drain is insulated.

7. The cookware with built in drain of claim 5 wherein said internal plate is rotationally urged by a knob.

8. The cookware with built in drain of claim 7 wherein said knob is interlinked with said internal plate such that said knob rotates said internal plate by sliding back and forth laterally.

9. A cookware with built in drain comprising:
   (a) a skillet;
   (b) said skillet having a bottom surface and a side surface;
   (c) a drain;
   (d) said drain being controlled by a valve attached to said side surface near said bottom;
   (e) a strainer;
   (f) said strainer having a strainer bottom and strainer side;
   (g) said strainer being of a size and shape that conforms to and fits snuggly within said skillet;
   (h) said strainer being pierced by a plurality of apertures along said bottom surface, and said plurality of apertures may be opened and closed by a rotating internal plate, said rotating internal plate being pierced by a plurality of complementary apertures of the same size and shape as said plurality of apertures in said strainer;

(i) a lid;
(j) said lid being of a size and shape that conforms to and fits snuggly on top of said skillet and said strainer;
(k) said lid having a handle; and
(l) said handle being located at the center of a top surface of said lid.

10. The cookware with built in drain of claim 9 wherein said drain is insulated.

11. The cookware with built in drain of claim 9 wherein said internal plate is rotationally urged by a knob.

12. The cookware with built in drain of claim 11 wherein said knob is interlinked with said internal plate such that said knob rotates said internal plate by sliding back and forth laterally.

* * * * *